United States Patent [19]
Andrieu et al.

[11] Patent Number: 5,496,662
[45] Date of Patent: Mar. 5, 1996

[54] CATHODE MATERIAL FOR AN ELECTRIC CELL

[75] Inventors: Xavier Andrieu, Bretigny sur Orge; Béatrice Rambla, Palaiseau, both of France

[73] Assignee: Alcatel Alsthom Compagnie Generale D'Electricite, Paris Cedex, France

[21] Appl. No.: 326,215

[22] Filed: Oct. 20, 1994

[30] Foreign Application Priority Data

Oct. 21, 1993 [FR] France ................... 93 12570

[51] Int. Cl.$^6$ ................................. H01M 4/60
[52] U.S. Cl. .................. 429/213; 429/215; 429/108; 429/128; 429/192; 429/194; 204/291; 252/500; 252/502
[58] Field of Search ..................... 429/108, 128, 429/213, 215, 192, 194; 204/291; 252/500, 502

[56] References Cited

U.S. PATENT DOCUMENTS

| | | | |
|---|---|---|---|
| 4,833,048 | 5/1989 | Dejonghe et al. | 429/213 |
| 5,162,175 | 11/1992 | Visco et al. | 429/213 |

FOREIGN PATENT DOCUMENTS

| | | |
|---|---|---|
| 0415856A2 | 3/1991 | European Pat. Off. . |
| 0424827A1 | 5/1991 | European Pat. Off. . |
| 2158987A | 11/1985 | United Kingdom . |
| WO9106132 | 5/1991 | WIPO . |
| WO9113472 | 9/1991 | WIPO . |

OTHER PUBLICATIONS

French Search Report FR 9312570.

*Primary Examiner*—Bruce F. Bell
*Attorney, Agent, or Firm*—Sughrue, Mion, Zinn, Macpeak & Seas

[57] ABSTRACT

The present invention concerns an electrode for an electrochemical primary cell, the electrode comprising a first electron conducting compound and a second ion conducting compound which consists of a sulfur-containing polymer with a repeating unit which contains a polyether, and which can contain an ionizable salt, characterized in that the backbone of said polymer contains bonds which render it capable of reversible oxidation and reduction. Preferably, said repeating unit is a polyether of the following type, containing two sulfur-containing ternary amine terminal groups:

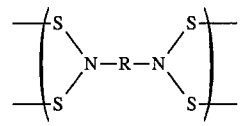

where R is a polyether selected from polyethylene oxide, polypropylene oxide, and their statistical, alternating, block and graft polyether copolymers.

10 Claims, 6 Drawing Sheets

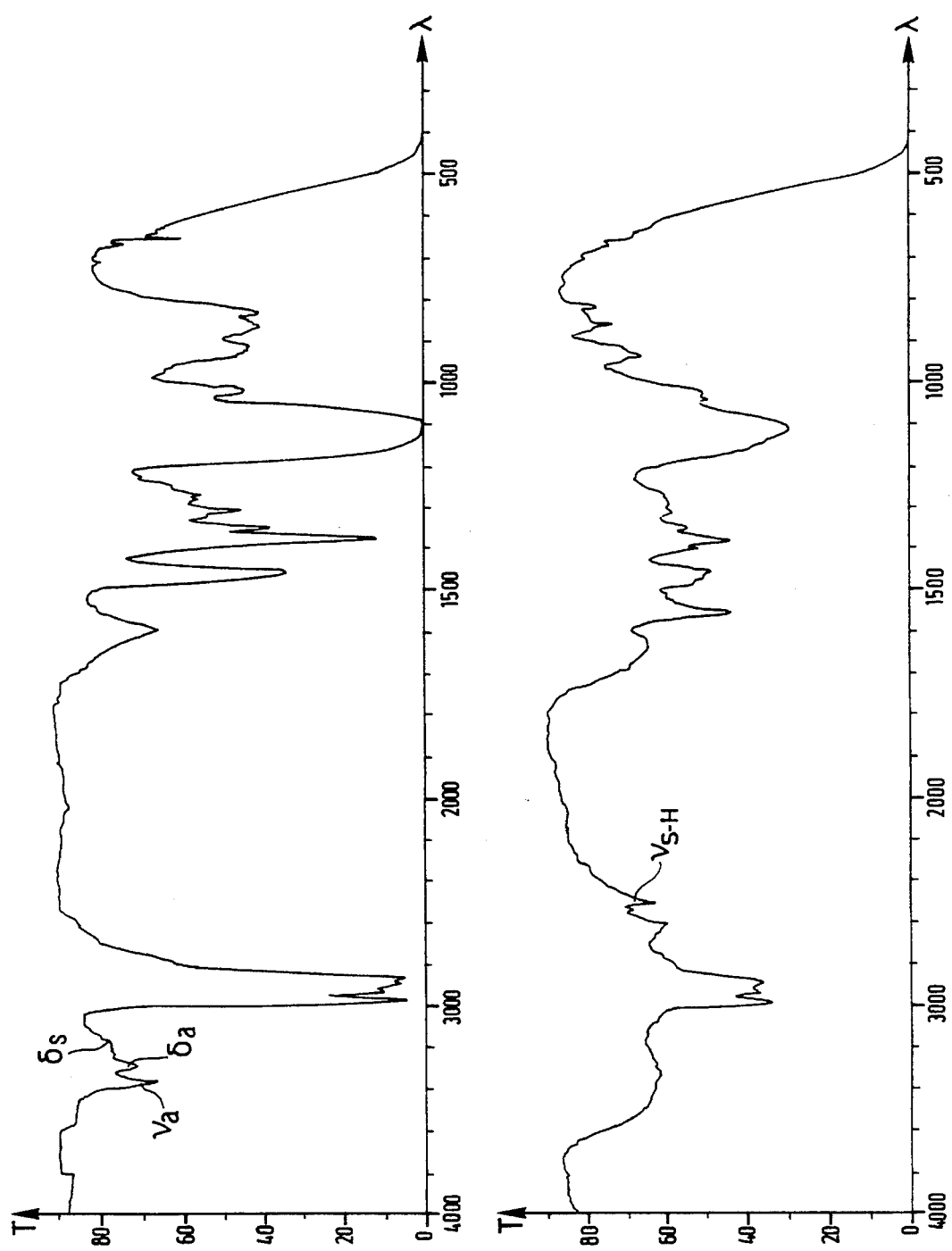

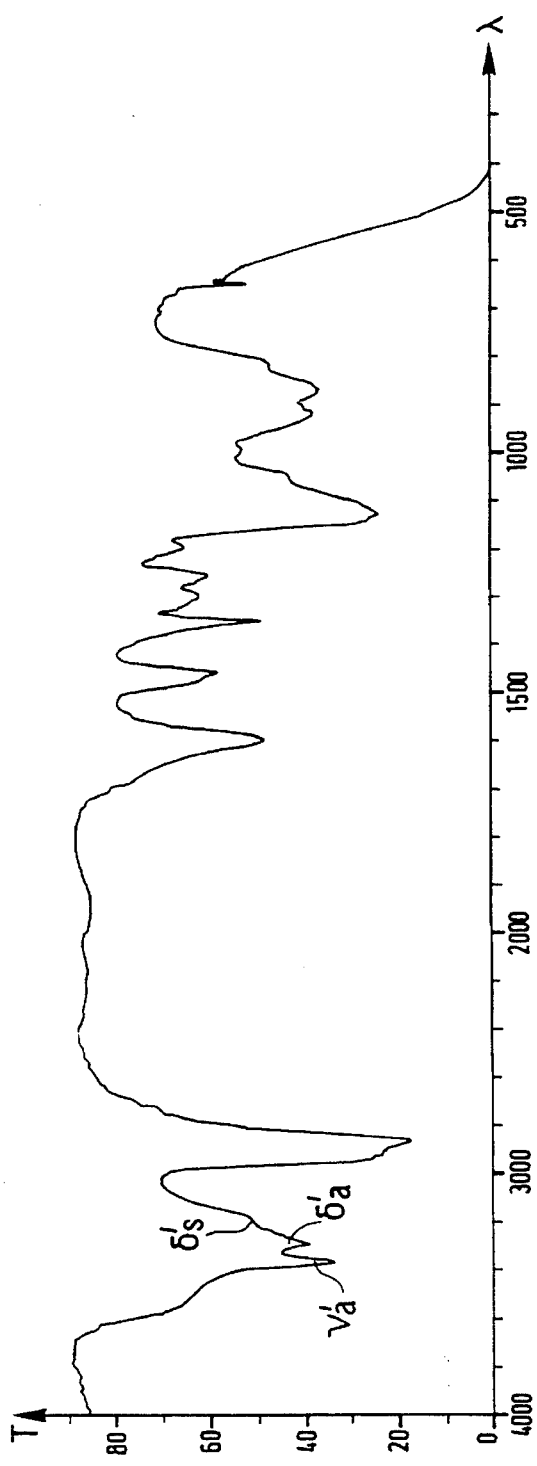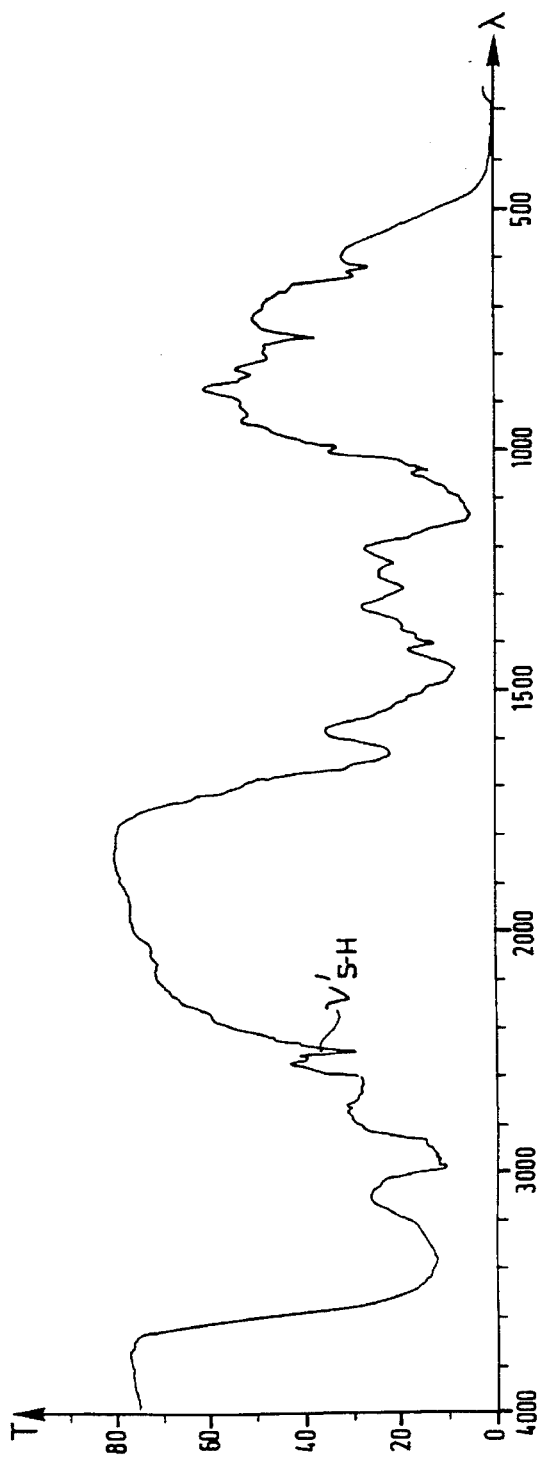

CATHODE MATERIAL FOR AN ELECTRIC CELL

The present invention concerns a cathode material for an electrochemical primary cell, a method of preparing it, and cells containing this material.

Two properties are essential for such an electric cell: electron conductivity and ion conductivity. Electron conductivity in the electrodes is provided by high specific surface area carbon black, which they normally contain. Ion conductivity is provided by a liquid or solid polymeric electrolyte which requires a large amount of material. The electrodes also contain a redox compound where the electrochemical reaction occurs.

Liquid cathode batteries are known in which the cathode is constituted by a current collector, normally carbon black, and an electrochemically active material which is the electrolyte itself. The liquid electrolyte acts both as the redox compound and as the ion conductor.

SUMMARY OF THE INVENTION

For satisfactory operation, the electrolyte must be in contact with the entire electron conductor surface. Impregnating the current collector with liquid electrolyte is a delicate operation which poses problems of reproducibility.

Patent document WO-91/13472 describes a polymeric organosulfur ion conductor. The polymer is obtained by substituting S and/or NR groups for a portion of the oxygen atoms in a polyether structure. In the NR group, R contains electronegative sites which can associate with a cation to produce ion conductivity in the polymer. The polymer can be used in an electrode as a solid electrolyte.

Studies have been carried out on cathode materials from a number of organosulfur compounds, in particular $(SRS)_n$ polymers. They behave as redox compounds, i.e., they depolymerize when a current is passed, then they repolymerize when it is passed in the opposite direction. This reaction is written as follows:

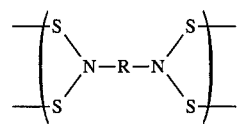

electrodepolymerization/reduction $(SRS)_n + 2n\ e^- \rightleftarrows n\ (SRS)^-$ electropolymerization/oxidation Patent document WO-91/06132 describes an example of a material of that type. The positive electrode of the secondary cell described comprises an organosulfur redox polymer as the electroactive material, a carbon black conductor, and a solid polymeric electrolyte (PEO). The problem with such an electrode is that its ion conductivity is almost zero in the absence of an electrolyte. Since a reduction in electrolyte volume proportionally reduces the quantity of electrochemically active material in the electrode, the capacity of the cell is also reduced.

The present invention particularly concerns an electric cell electrode based on a polymeric material with improved capacity per unit mass and per unit volume over known electrodes.

The object of the present invention is to provide an electric cell electrode containing a considerably increased proportion of electrochemically active material.

The present invention thus provides an electrode for an electrochemical primary cell, the electrode comprising a first electron conducting compound and a second ion conducting compound which consists of a sulfur-containing polymer with a repeating unit which contains a polyether, and which can contain an ionizable salt, characterized in that the backbone of said polymer contains bonds which render it capable of reversible oxidation and reduction.

The second compound simultaneously acts as the electroactive material by depolymerizing and repolymerizing, and as an ion conductor by forming a complex with an ionizable salt. Thus there is no need for the introduction of a third compound to act either as the redox compound or as the ion conductor.

Said bonds are preferably sulfur-sulfur bonds.

Prior art organosulfur compounds contain —S—S— bonds which are grafted onto alkyl chains which exhibit no useful electrochemical properties and, in fact, reduce the specific capacity because of their high molecular weights. The advantage of the present invention is that the carbon backbone carrying the —S—S— bonds is itself an ion conductor when an ionizable salt is incorporated into its structure. Because of this, the second compound is both an ion conductor and a redox compound.

In a preferred embodiment of the invention, the second compound is constituted by a polymer with a polyether repeating unit of the following type, containing two sulfur-containing ternary amine terminal groups:

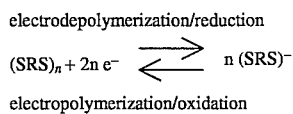

where R is a polyether.

More preferably, said polyether is selected from polyethylene oxide (PEO), polypropylene oxide (PPO) and their statistical, alternating, block and graft polyether copolymers.

The molecular weight of said polyether is between 100 and 100000.

The inorganic salt is added in a proportion of between 5% and 25% of the weight of the polymer, preferably in a proportion of between 10% and 20% by weight.

The salt, or mixture of salts, is of the type $M^+X^-$, where $M^+$ is at least one cation selected from $Li^+$, $Na^+$, $K^+$, $NH_4^+$, $Mg^{2+}$, $Ca^{2+}$, and $X^-$ is at least one anion selected from $ClO_4^-$, $AsF_6^-$, $PF_6^-$, $BF_4^-$, $CF_3SO_3^-$, $N(CF_3SO_2)_2^-$, $C(CF_3SO_2)_3^-$.

Said first compound is in a proportion of between 2% and 50% of the weight of the mixture of the two compounds, preferably between 5% and 30% by weight, more preferably between 5% and 15% by weight.

The first compound is selected from carbon black, preferably with a large specific surface area such as "KETJEN" black or acetylene black, activated carbon, or graphite.

The electrode of the invention is produced by mixing the first electron conducting compound with the second polymer and the inorganic salt in the presence of a solvent, then spreading this mixture on a support and evaporating off the solvent.

In a preferred embodiment of the process, the second compound is prepared by reacting a polyether containing two primary amine terminal groups with sulfur monochloride $S_2Cl_2$ in the presence of an excess of triethylamine $N(C_2H_5)_3$ to trap the hydrochloric acid generated during synthesis, in the following reaction:

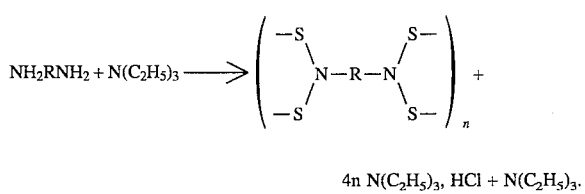

$$4n\ N(C_2H_5)_3, HCl + N(C_2H_5)_3.$$

The polymerization reaction can produce one-, two- or three-dimensional networks with intermolecular or intramolecular —S—S— bonds which can be represented as follows:

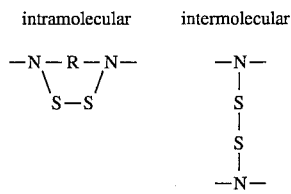

The electrode of the present invention is more particularly for use in a lithium cell containing an electrolyte composed of a lithium salt dissolved in a non aqueous solvent. The lithium salt is selected, for example, from lithium perchlorate, lithium trifluoromethanesulphonate and lithium trifluoromethanesulphonimide.

BRIEF DESCRIPTION OF THE DRAWINGS

The invention with its advantages and features will be better understood from the following examples of embodiments which are given by way of non limiting example, referring to the accompanying drawings in which:

FIG. 1A is an infrared spectrum of polypropylene oxide; the abscissa shows the wavelength $\lambda$ in $cm^{-1}$ and the ordinate shows the transmittance T which is a dimensionless number;

FIG. 1B is analogous to FIG. 1A and shows the infrared spectrum of an organosulfur polymer in accordance with the invention produced from the polyether of FIG. 1A;

FIG. 4A is analogous to FIG. 1A and shows the infrared spectrum of polyethylene oxide;

FIG. 4B is analogous to FIG. 4A and shows the infrared spectrum of an organosulfur compound in accordance with the invention produced from the polyether of FIG. 4A;

DETAILED DESCRIPTION OF THE INVENTION

EXAMPLE 1

An organosulfur polymer with a theoretical specific capacity of 102 Ah/kg and formula:

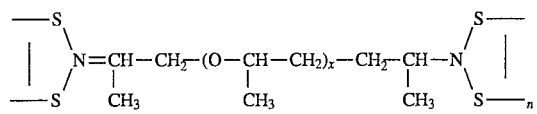

was prepared in accordance with the invention.

10 grams (g) of polypropylene oxide diamine (PPO) ("JEFFAMINE 400" from TEXACO) with formula:

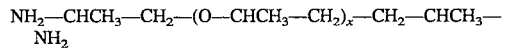

where x averages between 5 and 6, was introduced into a 250 ml flask. 30 ml of triethylamine $N(C_2H_5)_3$ and 50 ml of chloroform $CHCl_3$ were added.

4 ml of sulfur monochloride $S_2Cl_2$ dissolved in 20 $cm^3$ of chloroform $CHCl_3$ was added dropwise to the continuously stirred reaction mixture. The flask was stirred for 24 hours at 20° C. using a magnetic stirrer.

The progress of the reaction was followed by thin layer chromatography using a "60 F254" silica plate from MERCK and an eluent constituted by 95% by volume of methylene dichloride $CH_2Cl_2$ and 5% by volume of methanol $CH_3OH$. When the reaction had finished, the solvents were evaporated off and the reaction mixture was poured into one liter of vigorously stirred acetone. The solution obtained was filtered and the acetone was evaporated off overnight under a low vacuum at 50° C. The polymer was in the form of a sticky brown compound. The yield was 80%.

Infrared spectral analysis was carried out using a BECK-MANN "IR 4240" instrument. The spectrum of the starting product is shown in FIG. 1A. The spectrum of the organosulfur product obtained, is shown in FIG. 1B, shows that the primary amine bands ($v_a$, $\delta_a$ and $\delta_s$ bands which are characteristic of the $NH_2$ group at around 3300 $cm^{-1}$) have disappeared and a $v_{S-H}$ band has appeared at 2500 $cm^{-1}$. The range of this instrument meant that the $v_{S-S}$ band could not be observed.

Figure 2A:
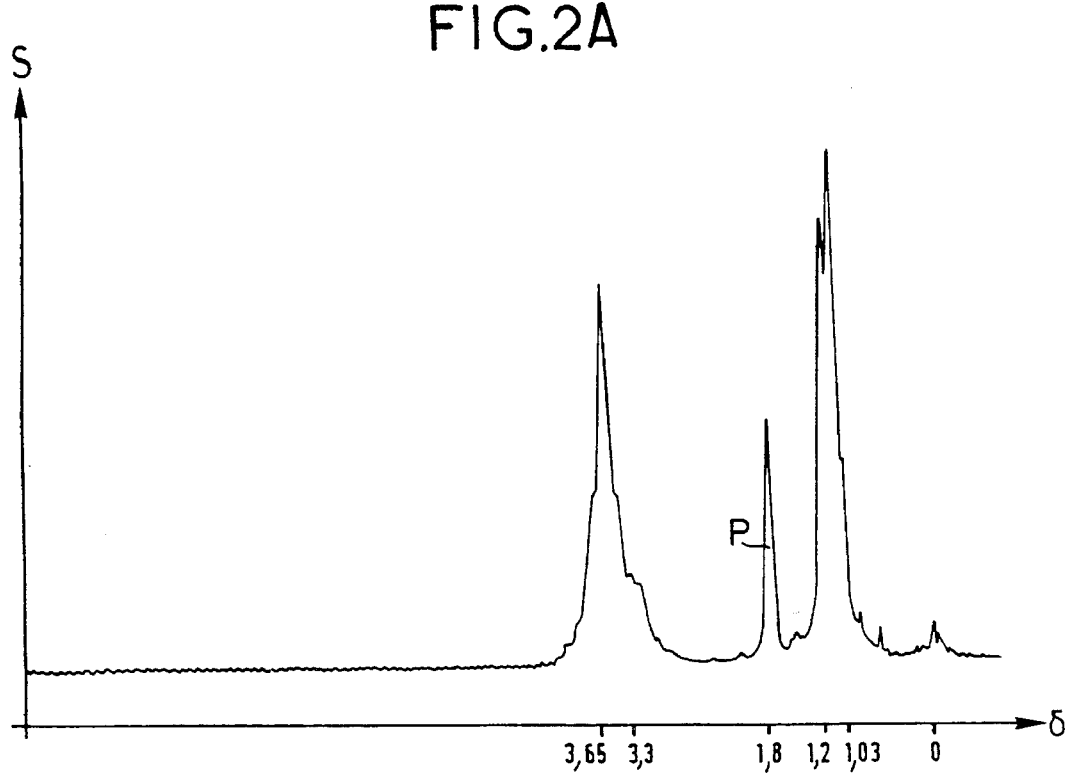
FIG. 2A is the nuclear magnetic resonance spectrum of polypropylene oxide; the abscissa shows the chemical displacement $\delta$ in ppm and the ordinate shows the signal amplitude S which is a dimensionless number.
Figure 2B:
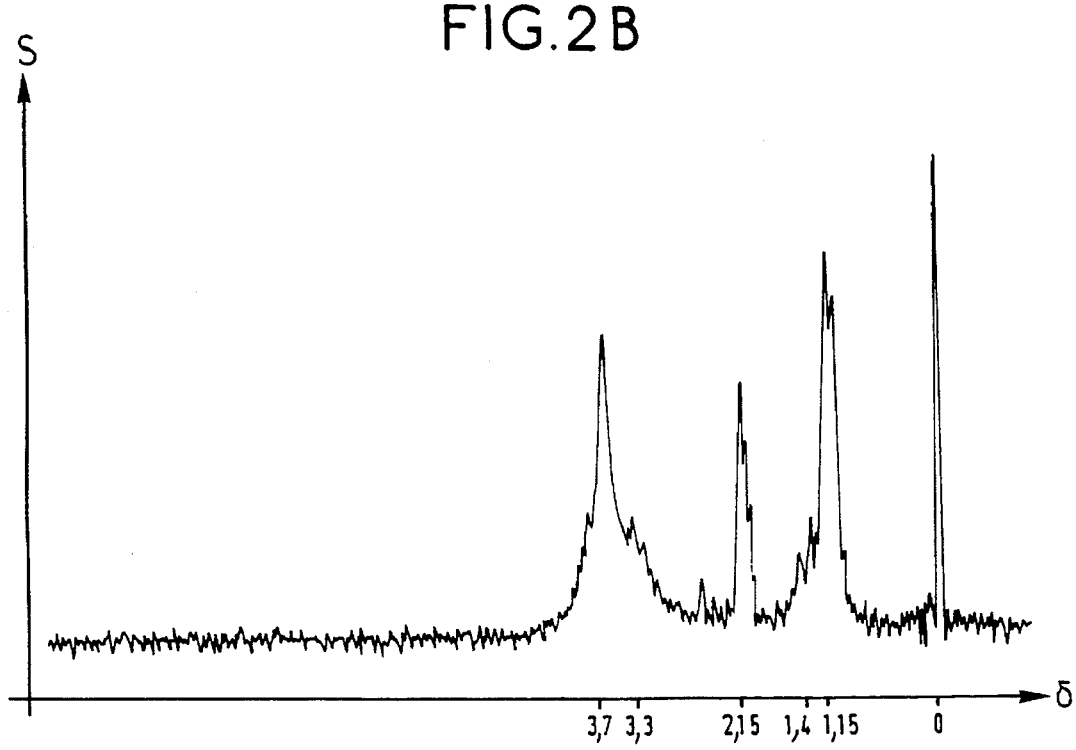
FIG. 2B is analogous to FIG. 2A and is the nuclear magnetic resonance spectrum of an organosulfur compound in accordance with the invention produced from the polyether of FIG. 2A.

Nuclear magnetic resonance (NMR) analysis was carried out using a VARIAN "EM-360" instrument at a frequency of 60 MHz. The spectrum of the starting product is shown in FIG. 2A. The spectrum of the product obtained, shown in FIG. 2B, shows the disappearance of peak P at 1.8 ppm, that of the primary amine, indicating a transformation of the N—H bonds.

Ion conductivity measurements were carried out using two nickel pellets. 10% by weight of lithium perchlorate $LiClO_4$ was added to the polymer prepared above. The mixture was dissolved in ethanol, applied to one nickel pellet and dried under low vacuum at room temperature. The conductivity was $10^{-6}$ $S.cm^{-1}$ at 25° C., comparable to those obtained for the majority of solid polymer electrolytes.

A sample of 80 mg of the polymer prepared above was dissolved in 400 mg of a liquid electrolyte containing a propylene carbonate, PC, solvent and a molar (1M) concentration of lithium perchlorate, $LiClO_4$, as the salt. A current collector support, constituted by carbon black powder bonded with polytetrafluoroethylene (PTFE), was impregnated with this solution. The electrode thus formed was placed against a lithium counter-electrode in a button type test cell containing the electrolyte.

Figure 3:
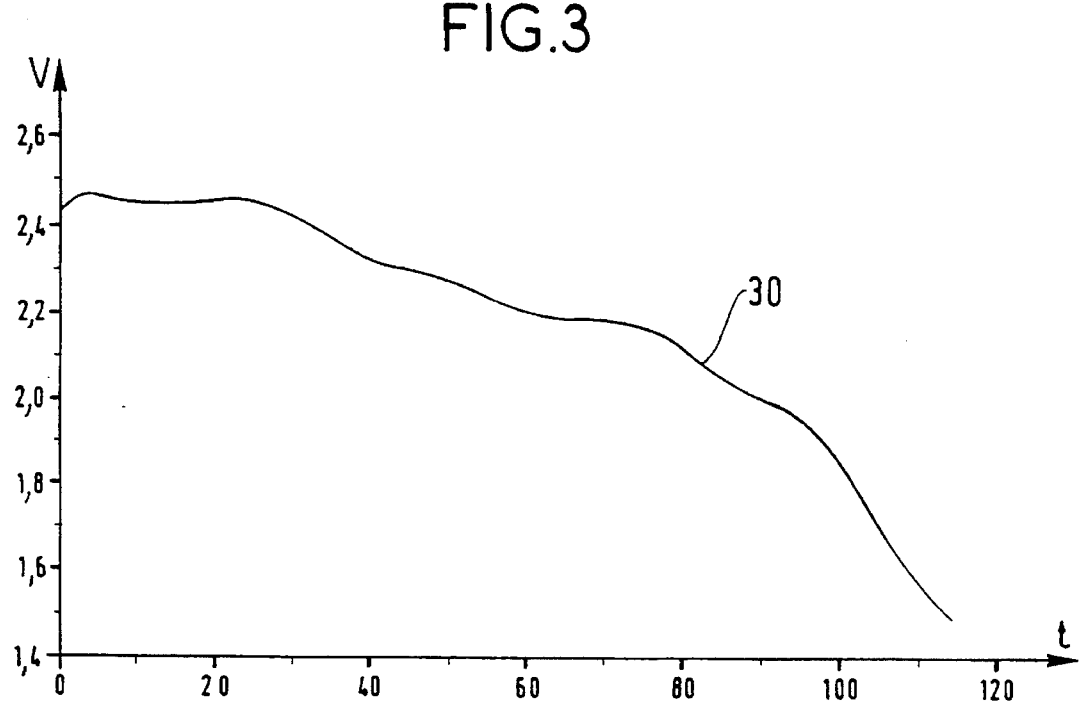
FIG. 3A shows the galvanostatic discharge curve for the organosulfur compound of the invention from FIGS. 1B and 2B; the abscissa shows the discharge time t in hours and the ordinate shows the tension V in volts.

The capacity of the polymer was measured by galvanostatic discharge at a temperature of 60° C. and an electrode current density of 50 µA/cm². This is shown as curve 30 in FIG. 3. A specific capacity of 72 Ah/kg was obtained for the organosulfur polymer, i.e., a yield of 70%.

EXAMPLE 2

An organosulfur polymer with a theoretical specific capacity of 391 Ah/kg and formula:

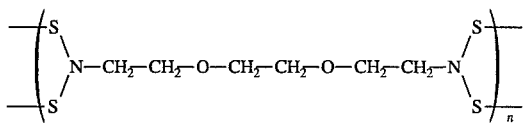

was prepared in accordance with the invention.

This polymer was synthesized in analogous manner to that of Example 1 using polyethylene oxide diamine (PEO) ("EDR 148" from TEXACO) with formula:

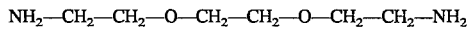

A sticky brown product was obtained which was dried under low vacuum before use.

The infrared spectrum of the starting product is shown in FIG. 4A. The spectrum of the organosulfur product, shown in FIG. 4B, shows that the $v'_a$, $\delta'_a$ and $\delta'_s$ bands which are characteristic of the primary amine have disappeared and the S—H band, represented by $v'_{S-H}$, has appeared.

Figure 5A:
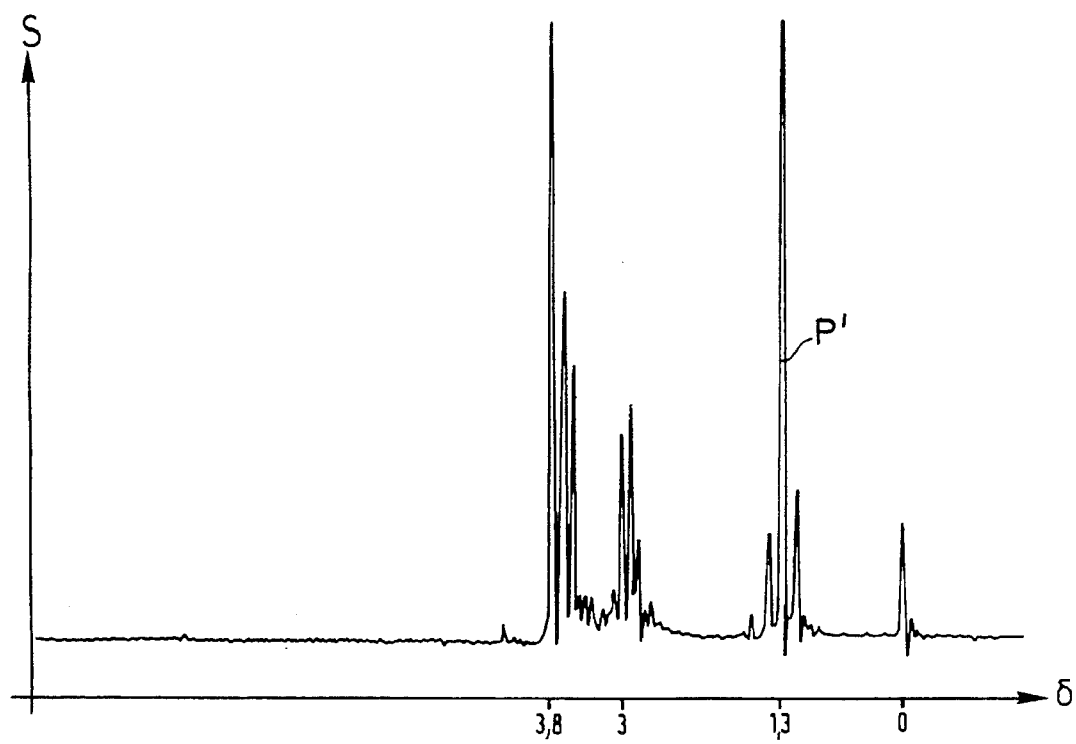
FIG. 5A is analogous to FIG. 2A and shows the nuclear magnetic resonance spectrum of polyethylene oxide.
Figure 5B:
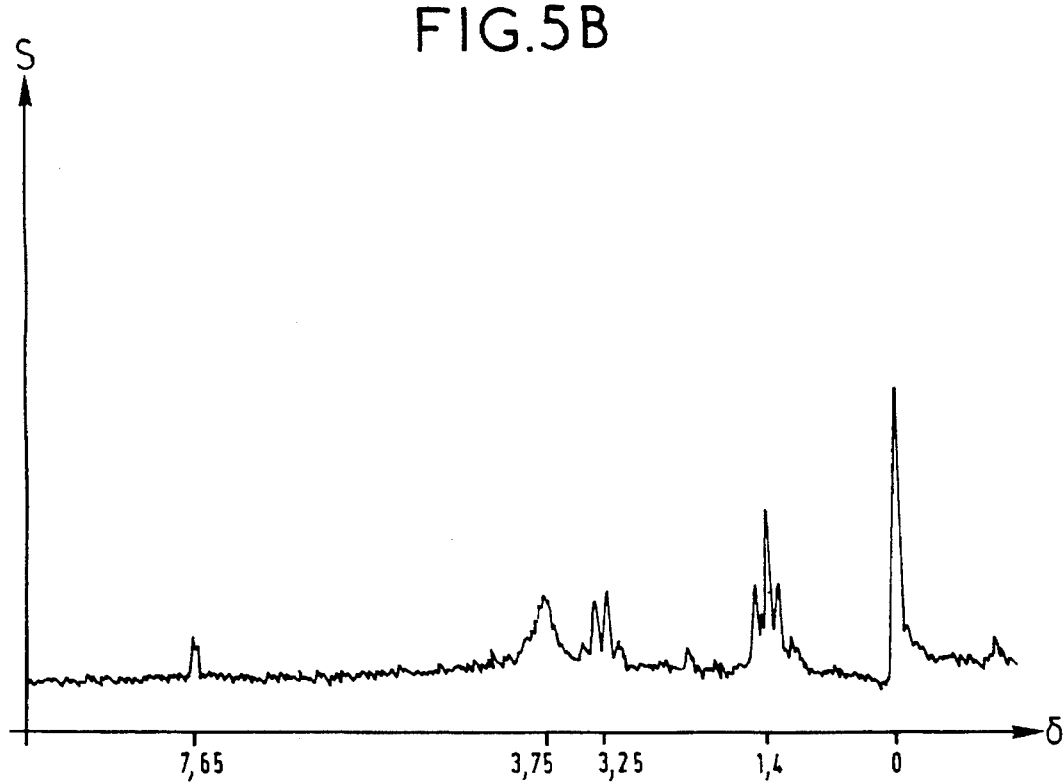
FIG. 5B is analogous to FIG. 5A and shows the nuclear magnetic resonance spectrum of an organosulfur compound of the invention produced from the polyether of FIG. 5A.

Nuclear magnetic resonance analysis of the organosulfur compound (FIG. 5B) shows the disappearance of peak P' of the primary amine at 1.5 ppm, visible in the spectrum of the starting product (FIG. 5B), indicating transformation of the N—H bonds.

Figure 6:
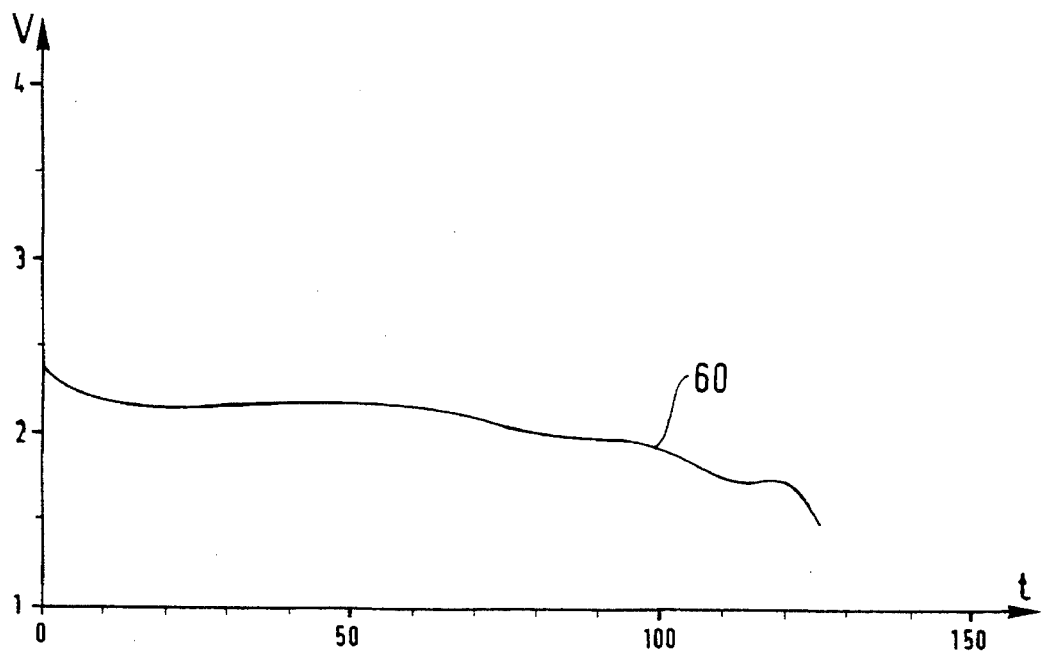
FIG. 6 is analogous to FIG. 3 and shows the galvanostatic discharge curve for the organosulfur polymer of the invention from FIGS. 4B and 5B.

The ion conductivity, measured as described in Example 1, was $10^{-7}$ S.cm$^{-1}$ at 25° C.

the specific capacity was measured as described in Example 1 and is shown as curve 60 in FIG. 6. It gave a value of 190 Ah/kg of organosulfur compound, i.e., a yield of 48%.

EXAMPLE 3

Figure 7:
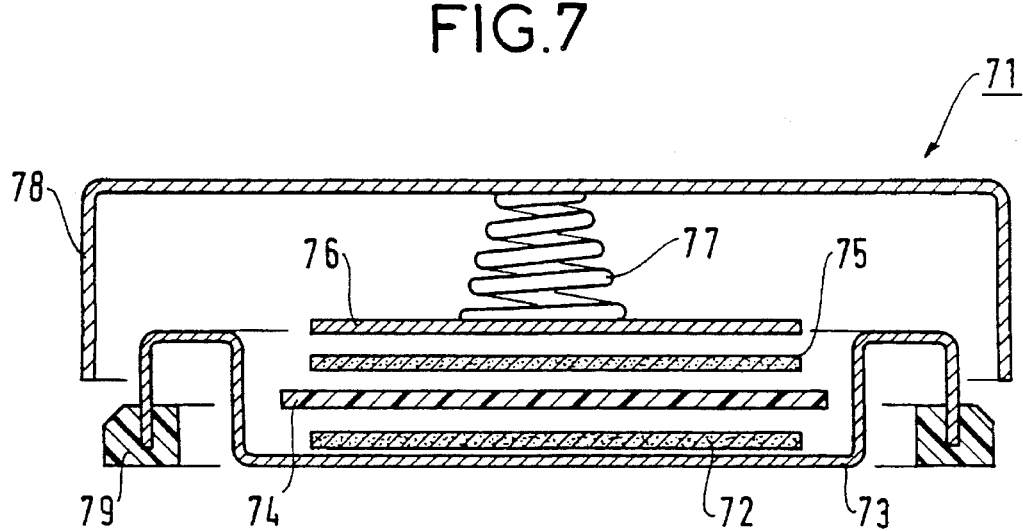
FIG. 7 illustrates a cell containing an electrode in accordance with the invention.

A button type electric cell 71 was assembled as shown in FIG. 7, comprising cathode 72 in accordance with the invention, produced as follows. 5 mg of carbon black, 50 mg of the sulfur-containing polymer prepared in Example 2, and 5 mg of the salt $LiClO_4$ were mixed in ethanol, $C_2H_5OH$. A portion of this mixture was spread on a current collector constituted by metal cup 73 of cell 71, and the ethanol was evaporated off. Cathode 72 was thus produced which was 10 µm thick and contained 7 mg of polymer.

Separator 74, 100 µm thick, was constituted by a high molecular weight (900 000) polyethylene oxide (PEO) film. It was produced by dissolving $LiClO_4$ salt, 10% by weight with respect to the PEO, in acetonitrile. The solution was poured into a mould and the acetonitrile was evaporated off at room temperature. The film obtained was then cut to the shape of a 20 mm diameter pellet, then dried for two hours under low vacuum.

Anode 75, constituted by a 12 mm diameter lithium pellet, was deposited on separator 74 and stainless steel spacer 76 ensured current pickup. Spring 77 ensured contact between the elements. The assembly was closed by cover 78 and the cell was closed by seal 79.

Figure 8:
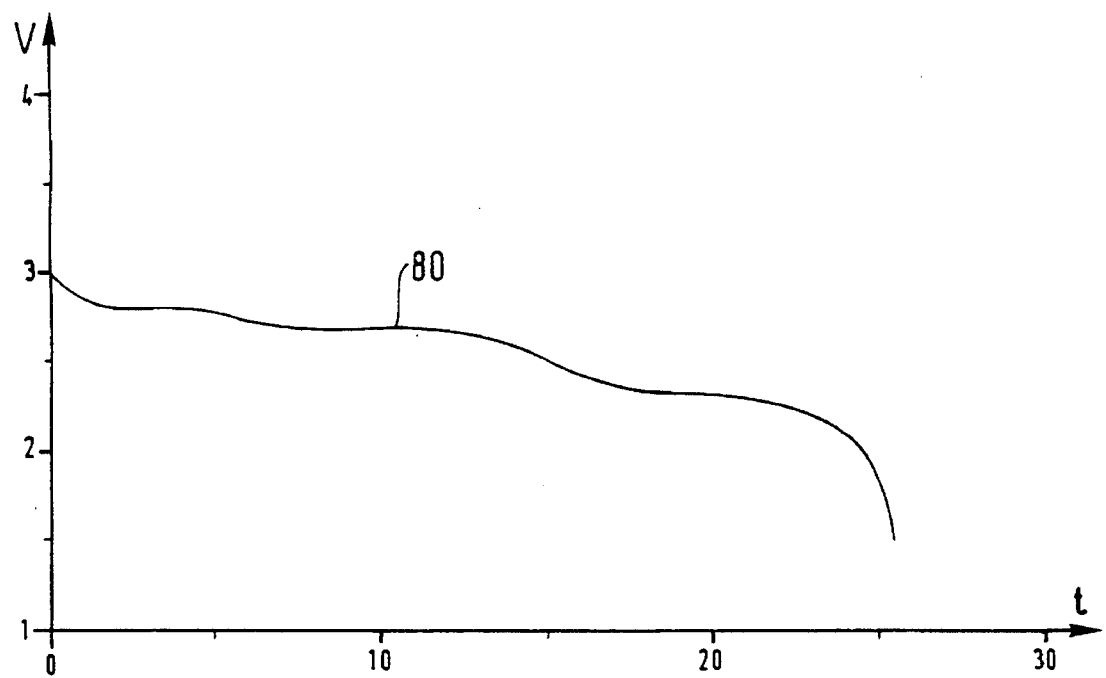
FIG. 8 is analogous to FIG. 6 and shows the galvanostatic discharge curve of a cell containing an electrode in accordance with the invention.

The cell capacity was measured by galvanostatic discharge, shown as curve 80 in FIG. 8, at a 50 µA/cm² cathode current and a temperature of 60° C. The measured capacity was 185 Ah/kg of organosulfur polymer, i.e., a yield of 47%.

The present invention is not limited to the embodiment described and illustrated: the skilled person could readily devise other embodiments without departing from the scope of the invention. Any means described could, for example, be replaced by an equivalent means without departing from the scope of the invention. In particular, the electrode of the present invention could also be used in a cell in which the electrolyte is liquid or solid.

We claim:

1. An electrode for an electrochemical primary cell, the electrode comprising a first electron conducting compound and a second compound wherein said second compound is both a redox compound and an ion conducting compound and wherein said second compound comprises a sulfur-containing polymer with a repeating unit including a polyether, said polymer containing an ionizable salt, and the backbone of said polymer containing sulfur-sulfur bonds which render it capable of reversible oxidation and reduction.

2. An electrode for an electrochemical primary cell, the electrode comprising a first electron conducting compound and a second compound wherein said second compound is both a redox compound and an ion conducting compound and wherein said second compound comprises a polymer containing an ionizable salt, said polymer having a repeating unit which is a polyether of the following type containing two sulfur-containing ternary amine terminal groups:

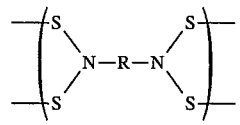

where R is a polyether, and the backbone of said polymer containing sulfur-sulfur bonds which render it capable of reversible oxidation and reduction.

3. An electrode according to claim 1 or claim 2, wherein said polyether is selected from the group consisting of polyethylene oxide, polypropylene oxide and their statistical, alternating, block and graft polyether copolymers.

4. An electrode according to claim 1 or claim 2, wherein the molecular weight of said polyether is between 100 and 100,000.

5. An electrode according to claim 1 or claim 2, characterized in that said salt is added in a proportion of between 5% and 25% of the weight of the polymer.

6. An electrode according to claim 1 or claim 2, wherein said salt is of the type $M^+X^-$, where $M^+$ is at least one cation selected from the group consisting of $Li^+$, $Na^+$, $K^+$, $NH_4^+$, $Mg^{2+}$, $Ca^{2+}$, and $X^-$ is at least one anion selected from the group consisting of $ClO_4^-$, $AsF_6^-$, $PF_6^-$, $BF_4^-$, $CF_3SO_3$, $N(CF_3SO_2)$ and $C(CF_3SO_2)_3$.

7. An electrode according to claim 1 or claim 2, characterized in that said first compound is present in a proportion of between 2% and 50% by weight of the mixture of said first and said second compounds.

8. An electrode according to claim 1 or claim 2, characterized in that said first compound is selected from carbon black, activated carbon and graphite.

9. A lithium cell including an electrode according to claim 1 or claim 2.

10. A method of producing an electrode for an electrochemical primary cell, the electrode comprising a first electron conducting compound and a second compound which is both a redox compound and an ion conducting compound and which comprises a polymer containing an ionizable salt, said polymer having a repeating unit which is a polyether of the following type containing two sulfur-containing ternary amine terminal groups:

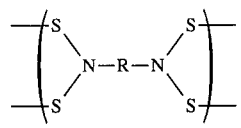

where R is a polyether, wherein said second compound is prepared by reacting a polyether containing two primary amine terminal groups with sulfur monochloride in the presence of triethylamine.

* * * * *